No. 897,569. PATENTED SEPT. 1, 1908.
F. E. BARENTZEN.
MEANS FOR PRODUCING ARTIFICIAL LIGHT FOR PHOTOGRAPHERS' USE.
APPLICATION FILED NOV. 10, 1906.
2 SHEETS—SHEET 1.
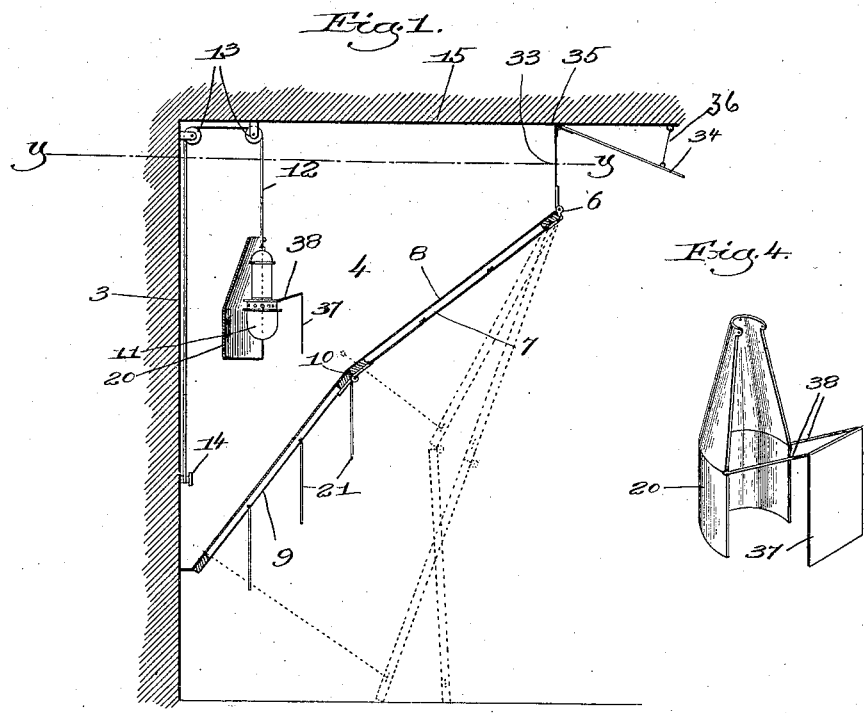
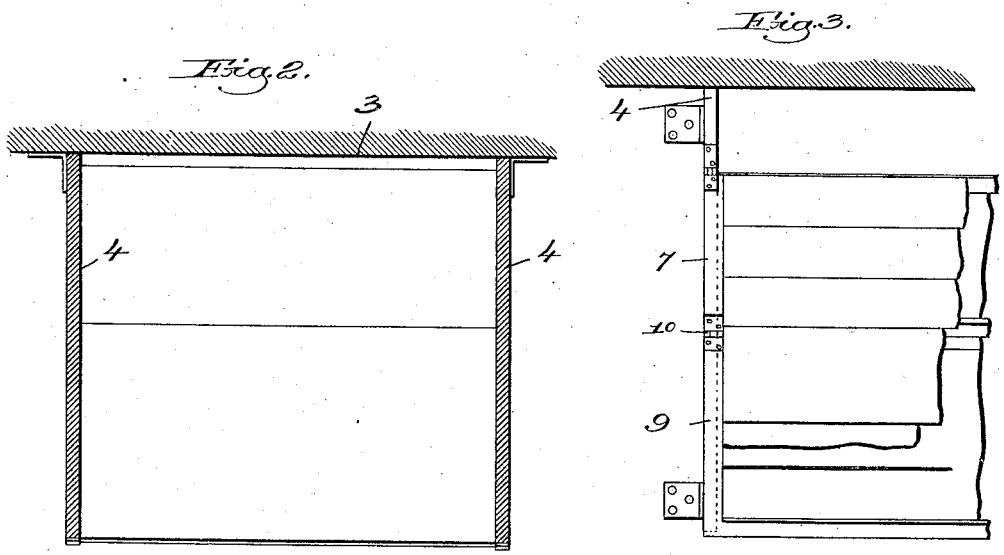

No. 897,569. PATENTED SEPT. 1, 1908.
F. E. BARENTZEN.
MEANS FOR PRODUCING ARTIFICIAL LIGHT FOR PHOTOGRAPHERS' USE.
APPLICATION FILED NOV. 10, 1906.
2 SHEETS—SHEET 2.
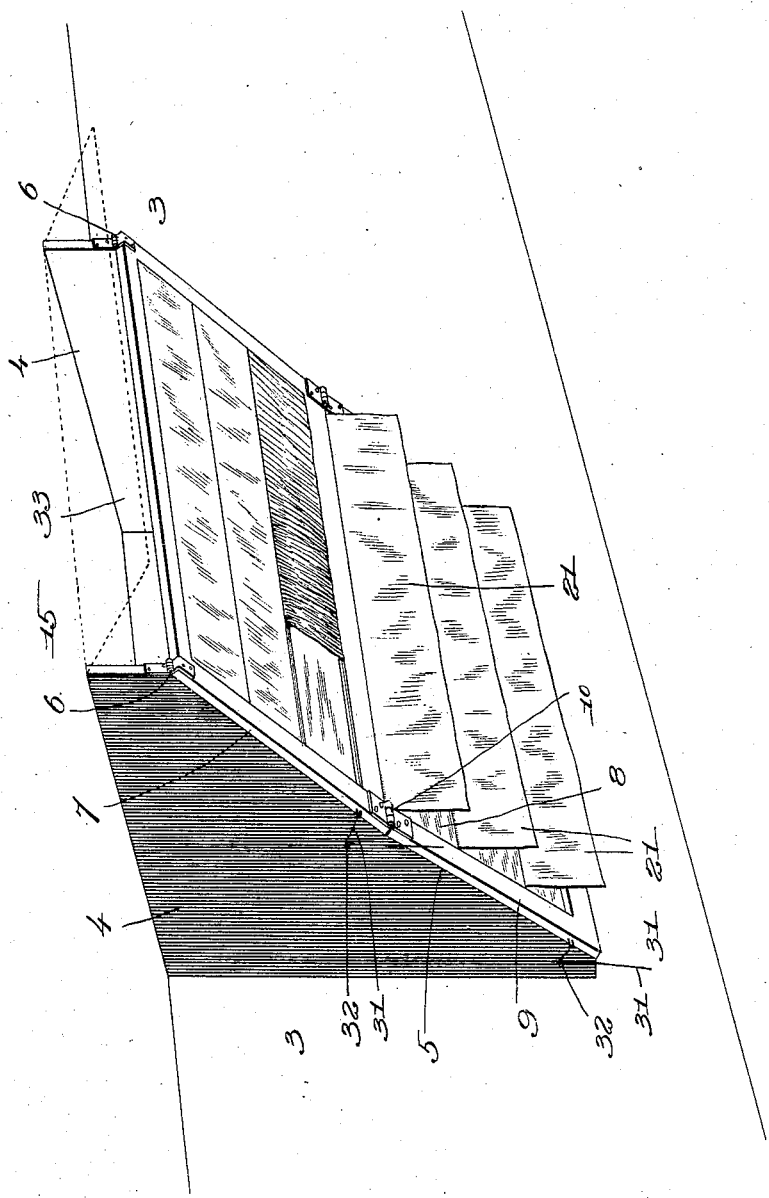

UNITED STATES PATENT OFFICE.

FRANK E. BARENTZEN, OF MALDEN, MASSACHUSETTS, ASSIGNOR TO WILLIAM G. BURNS, OF BOSTON, MASSACHUSETTS.

MEANS FOR PRODUCING ARTIFICIAL LIGHT FOR PHOTOGRAPHERS' USE.

No. 897,569.        Specification of Letters Patent.        Patented Sept. 1, 1908.

Application filed November 10, 1906. Serial No. 342,774.

*To all whom it may concern:*

Be it known that I, FRANK E. BARENTZEN, a citizen of the United States, residing at Malden, county of Middlesex, and State of Massachusetts, have invented an Improvement in Means for Producing Artificial Light for Photographers' Use, of which the following description, in connection with the accompanying drawing, is a specification, like letters on the drawing representing like parts.

The present invention has for its object to provide what might be called an artificial skylight for photographers' use, the invention being designed to take the place of the skylights now commonly used in photographic studios, and to enable a photographer to take pictures entirely by artificial light and to secure as good results in this way as is possible with the ordinary skylight arrangement in a studio. I propose to accomplish this end by arranging between the source of artificial light and the subject to be photographed a light-diffusing medium which is preferably so arranged that the diffused light emanating therefrom may be directed on to the subject at different angles.

By the use of my device the localized artificial light becomes as thoroughly diffused and can be directed on to the subject at different angles and with different degrees of intensity exactly as well as can be done with the ordinary skylight arrangement now ordinarily used by photographers.

In the drawings, wherein I have selected one embodiment of my invention for the purpose of illustrating its principle, Figure 1 is a vertical sectional view through a cabinet embodying my invention; Fig. 2 is a section on the line *y—y;* Fig. 3 is a partial front elevation; Fig. 4 is a perspective view of the hood for the artificial light; Fig. 5 is a perspective view showing one form of the invention, the top reflector 34 being omitted in said view, but the position thereof being shown in dotted lines.

The principal difficulty encountered in taking photographs by artificial light is that the light is too intensely localized and the common arrangements of screens now used in photographic studios are not adapted for properly diffusing and distributing the localized light, with the result that too intense lights and shades are produced in the photograph.

In the present embodiment of my invention, I provide for diffusing and distributing the localized light by the following means:—Extending outwardly from one wall 3 of the room or studio are two wings or side pieces 4 which are preferably of substantially the shape shown in Fig. 1 though they might be of other shapes without departing from the invention. These wings or side pieces extend clear to the ceiling and nearly to the floor, and the front edge 5 of each is preferably inclined downwardly and rearwardly. Hinged to the two sides or wings adjacent their upper ends, as at 6, is a framework 7 which extends from one wing to the other and which supports a screen 8 of some translucent or light-diffusing material. I have found that ordinary architects' cloth or tracing linen answers every purpose, although any suitable translucent or light-diffusing medium might be employed without departing from the invention. The frame 7 is preferably made in two sections, the upper section being pivoted to the wings, as at 6, and the lower section 9 being hinged to the upper section, as at 10.

The artificial light is designated generally by 11, and this may be of any suitable character, such, for instance, as an electric arc lamp. It is shown as being suspended from a cord 12 which passes over pulleys 13 secured to the ceiling and wall, and said lamp may be held in any vertically-adjusted position by securing the cord to a fastening device 14. The inner surfaces of the wings 4 and the surface of the wall 3 and of the ceiling 15, which is received between the wings 4, are white, or some other light color, while preferably the outer surfaces of the wings 4 are preferably black, or some dark color, and if desired the adjacent portions of the walls 3 exterior to the wings may also be dark colored or black. The light 11 lights or illuminates the entire light-diffusing screen 8, as will be obvious, and said screen 8 transmits the light into the chamber on the other side thereof and thoroughly diffuses the light.

In using the device the subject to be photographed will be placed under or adjacent the illuminated screen 8 and the latter will serve to shed sufficient light on the subject to permit the photograph to be taken. Since the entire screen is illuminated, the light will be directed on to the subject from a large area which is equivalent in every sense to the skylight commonly used in photographic studios.

By making the interior surfaces of the wings 4 and the surfaces of the wall 3 wide, the amount of light thrown on the screen will be increased by reflection from the wings and wall, and by making the exterior of the wings 4 dark and also by darkening the walls adjacent the wings any cross lights will be avoided.

The object of making the frame 7 in sections, and of hinging it to the wings, as at 6, is to permit the angular position of the light-diffusing surface to be changed. The light rays which are used to light the subject being photographed are those which emanate from the light-diffusing surface 8 at right angles thereto, and by adjusting the angular position of this surface, as shown by dotted lines Fig. 1, the illuminating rays may be thrown onto the subject from different directions according to the effects desired to be produced. The making of the frame 7 in two sections which are hinged together permits the diffused light to be thrown on to the subject from two different angles if desired. The sections of the frame 7 may be held in the desired adjusted position in any one of the several ways. One convenient way is to use cords 31 which are secured to either side of the frame and which may also be connected to fastening devices 32 on the wings. By lengthening or shortening these cords the angular position of the sections of the screen may be determined.

It will be noted that the light-diffusing surface does not extend clear to the ceiling, and as a result there is an open space 33 between the wings adjacent the ceiling. This open space 33 serves too as a means for ventilating the space in which the light is received, and also provides an opening through which the light from the lamp may be thrown on to a top reflector arranged to reflect the light thrown on to the top of the subject being photographed. In some instances the ceiling 15 itself, if it is of some light color, may act as the reflector to receive the light through the opening 33 and reflect the same down on to the subject.

In some instances it may be desirable to employ an adjustable top reflector in order that the reflected light may be thrown on to the subject from different angles. In Fig. 1 I have shown such an adjustable top reflector at 34. This reflector may be hinged to the front edge of the wings 4 closely adjacent the ceiling, as at 35, and will preferably have a reflecting surface so that the light rays which are projected through the open space 33 may strike the reflecting surface of the reflector and be reflected down on to the subject to be photographed. This top reflector 34 can be adjusted in different angular positions according to the effects desired to be produced and may be held in its adjustable position by any suitable securing means 36. In Fig. 5 the top reflector 34 is omitted in order to better show the construction behind said part, but the position of the reflector is shown in dotted lines. I propose also to use in connection with the light 11 a hood 20 which may be of the shape shown in Fig. 4 and which preferably has its interior surface of some light-reflecting and light-diffusing material, such as asbestos, the purpose of this hood being to direct more of the light rays radiating from the lamp 11 on to the screen 8. I may also if desired interpose a screen 37 between the light 11 and the light-diffusing screen 8 which is also of translucent material and which is for the purpose of still further diffusing the light 11 and causing it to be thrown evenly on to the screen 8. This screen 37 may be of any suitable translucent material, such as wax paper or thin cloth, or architects' paper, and it is shown as being suspended from an arm or bracket 38 extending from the lamp 11. If desired I may also use in connection with the screen 8 supplemental screens 21 of silk or other thin material which are mounted on wires extending transversely of the frame 7 and which may be placed across the front of the screen to cut off light transmitted through any section thereof. Some of these supplemental screens 21 may be suspended from their upper edge only and hang vertically, and others may be secured to the frame at both their lower and upper edges. I have herein shown the screens which are supported by the upper section of the frame as secured to the frame at both their upper and lower edges, while those secured to the lower section 9 are suspended from the upper edge only and hang vertically. These supplemental screens 21 permit me to vary at will the amount of light which is transmitted to the object to be photographed through any section of the main screen 8, and in this way the strength of the light which is shed upon different parts of said object may be varied to suit the conditions.

By my improved device the light-diffusing surface 8 becomes in effect the source of illumination from the subject, and because of its shape and light-diffusing properties, it distributes the light so evenly that there are no intense lights and shades as would be the case if a localized source of illumination such as a lamp were used for directly lighting the object to be photographed.

I have herein illustrated one embodiment only of my invention, and it will be obvious that this light-diffusing surface 8 can be made in various shapes and supported in various ways without departing from the invention.

Where the room is a wide room, the wings 4 may be extended from the wall 3, as shown in Figs. 1 and 5, but if the room is narrow enough, the side walls of the room may be used to support the frame 7 and light-diffusing member 8. In this case the frame 7 would extend from one side of the room to the other side thereof and be hinged to the walls of the room.

Having fully described my invention, what I claim as new and desire to secure by Letters Patent is:—

1. In apparatus for producing artificial skylight effects, the combination with a room or space for the object to be photographed, of a closed compartment separated from said room by a partition of translucent light-diffusing material, an artificial light situated within said compartment, and a plurality of supplemental screens mounted on said partition and arranged so that the amount of light transmitted to the object to be photographed through different parts of the partition may be varied.

2. In a device of the class described, the combination with an artificial light, of a translucent light-diffusing screen adjustably mounted to vary the angular relation thereof to a horizontal plane.

3. A device for producing artificial skylight effects comprising a chamber, one side of which is adjustable relative to the other sides and is composed of a translucent light-diffusing medium and an artificial light within the chamber.

4. A device of the class described comprising two wings extending laterally from the wall of a room and reaching to the ceiling, a translucent screen extending from one wing to the other and with said wings dividing the room into a space to receive the object to be photographed and a light-containing chamber, and an artificial light between the wings and within the light-containing chamber.

5. A device of the class described comprising two wings extending laterally from the wall of the room and reaching to the ceiling, a frame hinged to the wings and covered with translucent light-diffusing material and an artificial light back of the frame between the wings.

6. A device of the class described comprising two wings extending laterally from the wall of the room and reaching to the ceiling, a jointed frame hinged to the wings and covered with translucent light-diffusing material, and an artificial light back of the frame between the wings.

7. In a device of the class described, two wings extending laterally from the wall of the room and reaching to the ceiling, a frame hinged to the front edge of said wings at a point below the top thereof, a translucent light-diffusing medium covering said frame, and a light back of the frame between the wings.

8. In apparatus for producing artificial skylight effects, the combination with a room or space for the object to be photographed, of a compartment separated from said room by a partition of translucent light-diffusing material, an artificial light situated within said compartment, said partition being adjustable relative to said light, and a top-reflecting member above the light-diffusing member to reflect the light down onto the object to be photographed.

9. A device for producing artificial skylight effects comprising a chamber, one side of which is adjustable relative to the other sides and is composed of a translucent light-diffusing medium, said chamber having an opening above this medium, an artificial light within the chamber and a top reflector above the light-diffusing medium and arranged to receive the light coming through said opening and reflect said light down on to the subject to be photographed.

10. A device of the class described comprising two wings extending laterally from the wall of the room and reaching to the ceiling, a frame hinged to the front edge of said wings at a point below the top thereof, a translucent light-diffusing medium covering said frame, a light back of the frame between the wings, and a top reflecting member hinged to the front edge of said wings adjacent the ceiling.

In testimony whereof, I have signed my name to this specification, in the presence of two subscribing witnesses.

FRANK E. BARENTZEN.

Witnesses:
W. G. BURNS,
LOUIS C. SMITH.